United States Patent [19]

Satran

[11] Patent Number: 5,685,670
[45] Date of Patent: Nov. 11, 1997

[54] MILLING CUTTER WITH INSERT HAVING DEPRESSION BELOW CUTTING EDGE FOR AXIAL/RADIAL SUPPORT

[75] Inventor: Amir Satran, Kfar Vradim, Israel

[73] Assignee: Iscar Ltd., Migdal Tefen, Israel

[21] Appl. No.: 620,232

[22] Filed: Mar. 22, 1996

[30] Foreign Application Priority Data

Mar. 24, 1995 [IL] Israel ........................... 113121

[51] Int. Cl.⁶ ..................... B23C 5/02; B23C 5/08; B23C 5/22
[52] U.S. Cl. ........................ 407/42; 407/48; 407/113
[58] Field of Search .................... 407/42, 113, 114, 407/33, 34, 40, 41, 48, 103–105

[56] References Cited

U.S. PATENT DOCUMENTS

| 4,050,127 | 9/1977 | Bodem et al. | 407/107 |
|---|---|---|---|
| 4,648,760 | 3/1987 | Karlsson et al. | 408/223 |
| 4,669,924 | 6/1987 | Benson | 407/113 |
| 5,209,611 | 5/1993 | Drescher . | |
| 5,382,118 | 1/1995 | Satran et al. | 407/42 |
| 5,383,750 | 1/1995 | Satran et al. | 407/113 |
| 5,441,370 | 8/1995 | Pantzar et al. | 407/113 |

FOREIGN PATENT DOCUMENTS

| 1602780 | 12/1979 | Germany | 407/104 |
|---|---|---|---|
| 19302 | 1/1987 | Japan | 407/104 |
| 2433 | 7/1909 | United Kingdom | 407/103 |
| 2081142 | 2/1982 | United Kingdom | 407/103 |

*Primary Examiner*—Steven C. Bishop
*Attorney, Agent, or Firm*—Pennie and Edmonds, LLP

[57] ABSTRACT

A cutting insert a rotary cutting tool using the same. The cutting insert is a substantially prismoidal body having top, base and side surfaces and cutting edges formed at intersections of the top and side surfaces. The insert, when mounted in the tool, has at least one inoperative side surface which has at least one depression formed symmetrically with respect to a center of the side surface length. An upper portion of the depression is disposed substantially in the vicinity of the top surface. The depression has a bottom wall oriented substantially co-directionally with the side surface and a pair of side walls oriented substantially transversely to the side surface. The depression is designed so that, when the insert is mounted in the tool, at least one wall of the depression constitutes a support of the cutting insert in the direction along an axis of rotation of the tool.

28 Claims, 9 Drawing Sheets

5,685,670

MILLING CUTTER WITH INSERT HAVING DEPRESSION BELOW CUTTING EDGE FOR AXIAL/RADIAL SUPPORT

FIELD OF THE INVENTION

The present invention relates to rotary cutting tool assemblies for chip removing machining and, in particular, to combined peripheral and face milling cutters such as used, for example, in slotting operations, and replaceable cutting inserts for use therein.

BACKGROUND OF THE INVENTION

A milling cutter assembly for use in slotting operations usually comprises a disk-like tool holder with a plurality of cutting inserts which are releasably mounted in insert receiving pockets formed in the tool holder and distributed therein so as to be angularly spaced one from another around the tool holder circumference and so as to present a pair of operative peripheral and frontal cutting edges. The cutting inserts are very often of a square shape to have maximal number of indexable cutting edges.

Depending on specific applications and a desired cutting width, such milling cutter assemblies can have different designs. Thus, when relatively small cutting widths are required, e.g. for machining of narrow and deep slots, there are usually used full side and face milling cutters having tool holders in the form of an integral disk body in which insert receiving pockets are arranged at left and right sides thereof so that operative peripheral cutting edges of the cutting inserts are inclined in a staggered manner. When, however, larger cutting widths are required, the cutting tool assembly may be built of a number of half-side and face modular right-hand and left-hand disk cutters stacked in a alternating gang arrangement on an arbor of a spindle of the tool. In this case, the operating range of the milling cutters can be essentially increased by the increase of a total length of peripheral cutting edges operating simultaneously.

Since, in operations to which the present invention specifically apply, each cutting insert cuts with its peripheral cutting edge and its front cutting edge and, consequently, is subjected to radial and axial cutting forces, the insert receiving pockets formed in the tool holder have to provide for an adequate support of the inserts in radial and axial directions. In addition, such support arrangements are usually designed so as to ensure a required accuracy of positioning of the cutting inserts in the insert receiving pockets to obtain minimal radial and axial run-out of the tool. This is usually achieved by forming insert receiving pockets of tool holders with two mutually perpendicular pocket side walls.

FIG. 1 shows an example of a conventional full side and face milling cutter in which insert receiving pockets have radially and axially supporting side walls Sr and Sa. FIG. 1 illustrates how the existence of the axially supporting side wall Sa puts severe limitations on a minimal cutting width W which can be provided by the milling cutter during machining of a workpiece WP. Thus, as shown, in order to ensure a required support strength and rigidity, the side wall Sa occupies rather much space in the axial direction. Consequently, the cutting width W is defined not only by lengths D of the cutting edges of the inserts 1' and 1" but also by the dimension of the side wall Sa, which leads to the necessity for the cutting edges to overlap. Thus, for example, to obtain a minimal cutting width Wmin, the cutting inserts 1' and 1" should be positioned in the tool with maximal overlapping extent Emax. This clearly restricts a range of cutting widths which can be obtained by the milling cutter.

It is the object of the present invention to provide a new cutting insert and a new cutting tool assembly using the same, wherein the above disadvantages are overcome or at least reduced.

SUMMARY OF THE INVENTION

In accordance with the present invention there is provided a cutting insert for use in a rotary cutting tool having an axis of rotation, the insert being a substantially prismoidal body having top, base and side surfaces and cutting edges formed at intersections of the top and side surfaces;

the insert having at least one side surface adapted to be an inoperative side surface, when the insert is mounted in the tool, said side surface having at least one depression formed symmetrically with respect to a center of the side surface length, an upper portion of the depression being disposed substantially in the vicinity of said top surface;

the depression having a bottom wall oriented substantially co-directionally with said side surface and a pair of side walls oriented substantially transversely to said side surface, the depression being designed so that, when the insert is mounted in the tool, at least one wall of the depression constitutes an axial support portion of the cutting insert.

In accordance with the present invention there is also provided a rotary cutting tool comprising a tool holder having an axis of rotation and formed with at least one insert receiving pocket and at least one replaceable cutting insert releasably mounted therein by clamping means;

said cutting insert being a substantially prismoidal body having insert top, base and side surfaces, the top and side surfaces defining therebetween cutting edges;

said insert receiving pocket comprising pocket base and side surfaces such that the base surface of the pocket supports the insert base surface and the side surfaces of the insert and the pocket bear against each other at their portions oriented substantially co-directionally with said axis of rotation, providing thereby a radial support of the cutting insert, and at their portions oriented substantially transversely to said axis of rotation, providing thereby an axial support of the insert;

the insert side surface involved in said axial support being formed with at least one depression having a bottom wall substantially co-directional with said insert side surface and side walls substantially transverse thereto, characterised in that the pocket side surface involved in said axial support of the insert is formed with at least one protrusion mating with said at least one depression, the protrusion having face and side walls and being received within said depression so that at least one wall of the depression bears against the respective wall of the protrusion, whereby said axial support of the insert in the tool is achieved.

In accordance with the present invention there is further provided a tool holder for a rotary cutting tool, the tool holder having an axis of rotation and being formed with at least one insert receiving pocket adapted to releasably receive a cutting insert having base and side surfaces, in such a manner as to provide the insert support in radial and axial directions, at least one side surface of the insert which is supported in the axial direction being formed with at least one depression;

said insert receiving pocket comprising a base surface adapted to support the insert base surface end at least one side surface, which side surface is adapted to provide the insert support in the axial direction;

said side surface of the pocket being formed with at least one protrusion mating with said at least one depression, the protrusion having face and side walls, at least one of said face and side walls being oriented substantially transversely to said axis of rotation;

the protrusion being adapted for being received within said depression so that said wall of the protrusion oriented substantially transversely to said axis abuts a corresponding wall of the depression, providing thereby said support of the insert in the axial direction.

In a preferred embodiment of the present invention, the rotary cutting tool is milling cutter, in particular a full side and face milling cutter, the tool holder being of a disk-like shape and having either an integral or a tandem body.

According to one embodiment of the present invention, the insert receiving pocket has a single pocket side surface oriented substantially co-directionally with the axis of rotation of the tool, said axial support being achieved by at least one side wall of the depression of the insert bearing against a corresponding side wall of the protrusion of the pocket, said radial support being achieved by the abutment of non-recessed portions of said insert side surface upon respective non-protruding portions of the pocket side surface.

According to another embodiment of the present invention, the insert receiving pocket has two pocket side surfaces of which one is disposed substantially co-directionally with the rotary axis of the tool and provides for the insert support in the radial direction, while the other pocket side surface is disposed substantially transversely to the rotary axis of the tool and comprises said protrusion, the protrusion being of such dimensions as to ensure that the face wall thereof abuts the bottom wall of said depression, providing thereby said insert support in the axial direction.

Thus, with a rotary cutting tool and, in particular, its tool holder being designed according to the present invention, an axial support of a cutting insert, which takes place in a recessed portion of an insert inoperative side surface, requires either no or a substantially reduced additional space, whereby minimal cutting width provided by the tool can be effectively reduced to values about or even equal the length of the insert cutting edge. In addition, the design of the present invention allows for ganging modular tool units side by side by virtue of which a range of cutting widths of such cutting tools can be effectively broadened.

Preferably, said axial support of the insert occurs substantially adjacent to the top surface thereof, by virtue of which a more stable position of the insert in the insert receiving pocket of the tool can be achieved.

Preferably, the cutting insert of the present invention is an indexable cutting insert, in particular of a generally square shape, each side surface of the insert being formed with said at least one depression.

It should be acknowledged here that indexable cutting inserts having recessed side surfaces are known per se. However, in these cutting inserts such recesses are different and are formed for purposes other than that of the present invention.

Thus, in a cutting insert disclosed, for example, in U.S. Pat. No. 5,441,370 insert side walls are slightly recessed so as to limit the area of the side surface which requires after-grinding. This purpose has therefore nothing in common with the present invention. In U.S. Pat. No. 4,050,127, there is disclosed a cutting tool comprising an indexable cutting insert having recessed side surfaces adapted to receive a protrusion formed in a clamping device of the tool. The cutting tool is not a rotary tool, being designed for copy turning operations rather than for operation to which the present invention specifically refers and the purpose of the recess-protrusion engagement is to increase the insert positioning accuracy rather than to ensure that an axial support of the insert in the tool is such as to occupy minimal space, as in the present invention.

BRIEF DESCRIPTION OF THE DRAWINGS

For a better understanding of the present invention and to show how the same may be carried out in practice reference will now be made to the accompanying drawings, in which

FIGS. 4a, 4b, 4c and 4d are schematic fragmental cross-sectional views illustrating alternative designs of an insert support arrangement used in full side and face milling cutters, according to the embodiment of the present invention shown in FIG. 3a;

FIG. 5 is a perspective view of a full side and face milling cutter with insert receiving pockets designed as in FIG. 3a;

FIG. 8 is a cross-sectional view along the line VIII—VIII of the cutting tool of FIG. 7a;

DETAILED DESCRIPTION OF THE PREFERRED EMBODIMENTS

Figure 1:
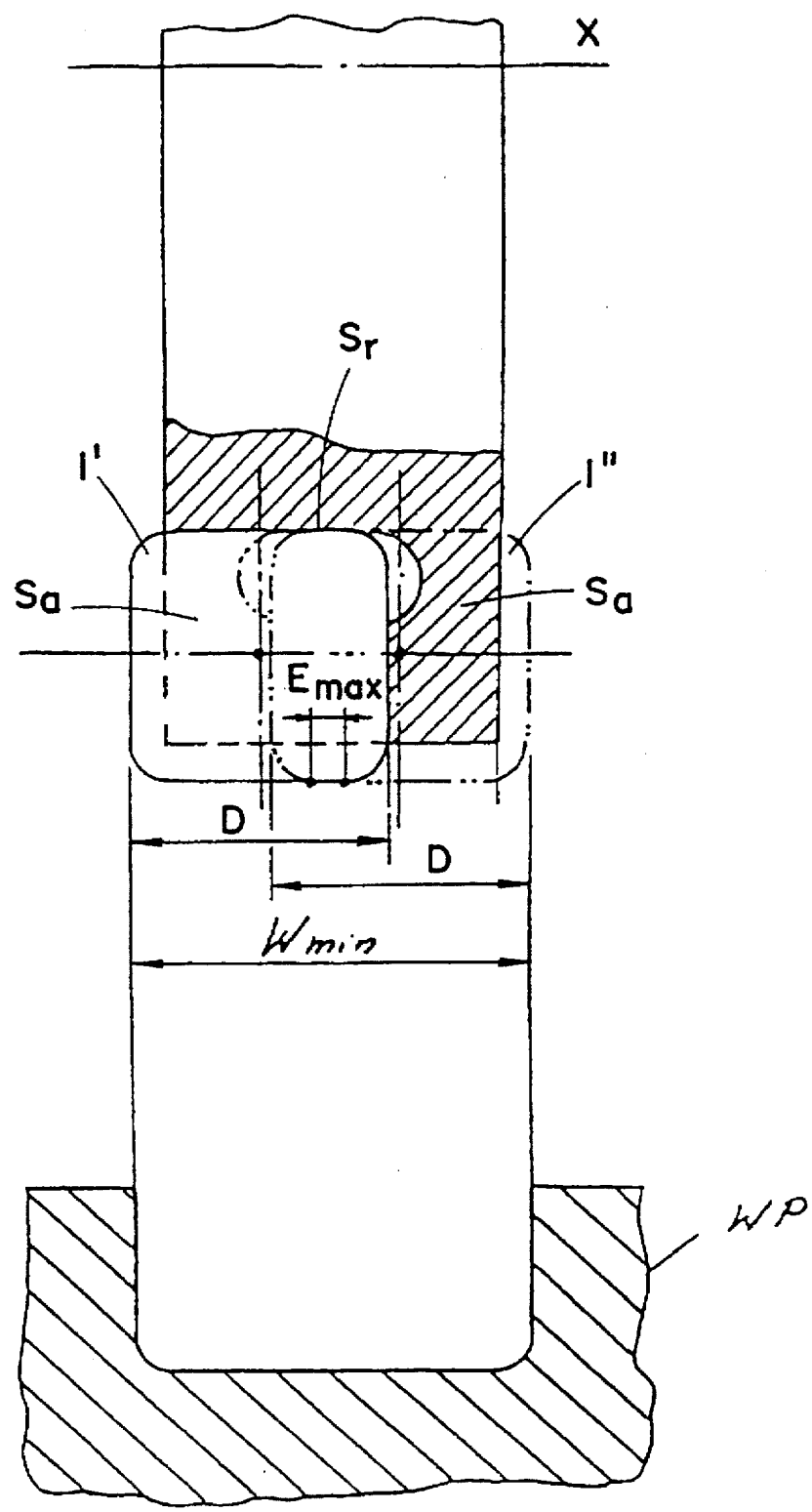
FIG. 1 illustrates how, in a conventional full side and face milling cutter, an insert axial support arrangement limits a range of cutting dimensions.

FIG. 1 illustrates a conventional full side and face milling cutter of the kind to which the present invention refers. As seen, the milling cutter comprises cutting inserts 1' and 1"

having a length D and releasably mounted in suitable insert receiving pockets arranged in an staggered manner in a disk-like tool holder 2 of the cutter having an axis of rotation X. As described above in more detail, FIG. 1 particularly illustrates how pocket side walls Sa having widths sufficient to ensure a required strength and rigidity of the insert support in the axial direction limit a minimal cutting width and consequently, a range of cutting widths obtained by the milling cutter.

Figure 2A:
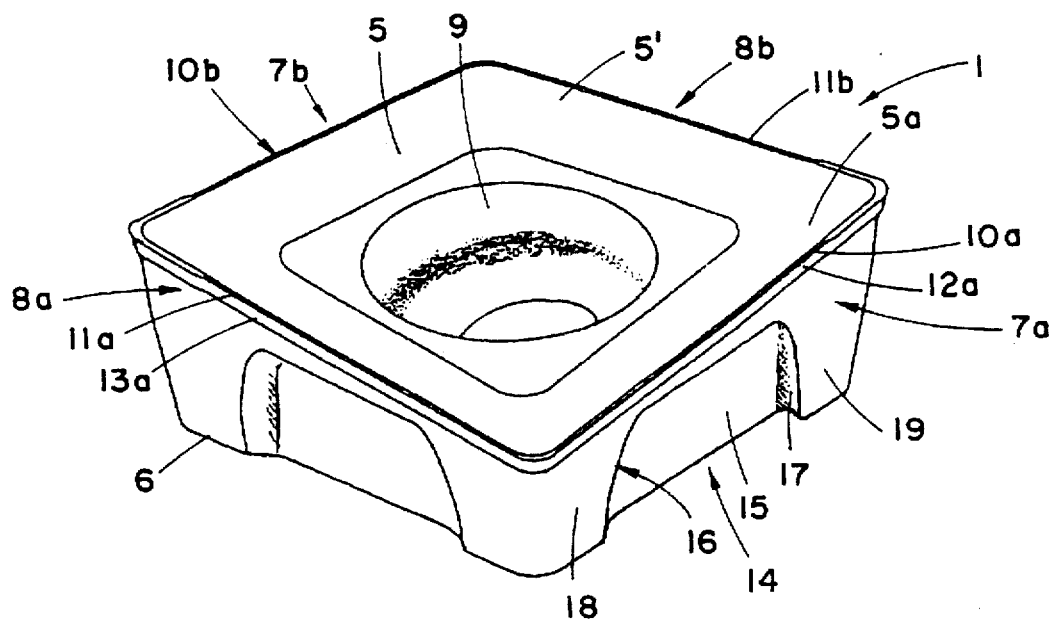
FIG. 2a and 2b are respectively perspective and bottom views of a cutting insert according to the present invention.
Figure 2B:
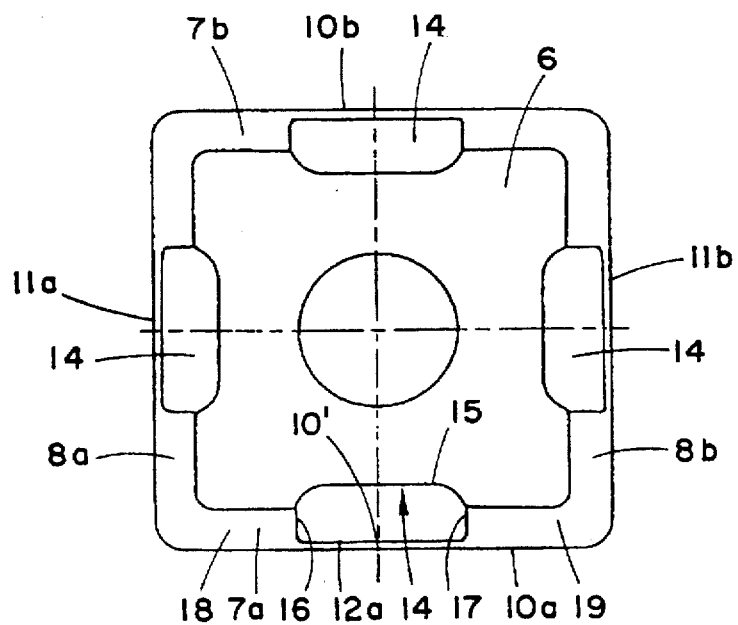

FIGS. 2a and 2b illustrate an indexable cutting insert 1 for use in a milling cutter according to the present invention. As seen, the cutting insert 1 is a prismoidal solid body having square top and base surfaces 5 and 6 and side surfaces 7a, 7b, 8a and 8b which extend upwardly and outwardly from the base surface 6 towards the top surface 5 of the insert. The insert 1 is formed with a centrally disposed clamping bore 9 for mounting the insert 1 in the tool holder by clamping means (not shown).

The cutting insert 1 has two pairs of substantially identical cutting edges 10a and 10b and 11a and 11b, for example such as described in U.S. Pat. No. 5,383,750 or in a co-pending U.S. patent application Ser. No. 08/520,231 incorporated herein by reference. The cutting edges are formed at an intersection of an adjacent rake face 5' of the top surface 5 with a respective relief flank 12a, 12b, 13a or 13b (only 12a and 13a being shown) of the respective side surface 7a, 7b, 8a or 8b. The cutting edges 10a and 10b are directed substantially transversely to the cutting edges 11a and 11b. Since the surfaces 7a, 7b, 8a and 8b of the cutting insert 1 have the same design, only the surface 7a will be described herebelow.

As seen, the side surface 7a is formed with a depression 14 extending from the base surface 6 of the insert 1 to the relief flank 12a adjacent to the cutting edge 10a and disposed centrally with respect to the length of the side surface 7a. The depression 14 has a bottom wall 15 substantially parallel the side wall 7a and side walls 16 and 17 oriented substantially transversely to the side wall 7a and merging with respective lateral portions 18 and 19 thereof. Generally, the bottom wall 15 of the depression 14 is directed with respect to the base surface 6 in such a manner as to facilitate the insert manufacturing by means of pressing and ejecting the insert in a powder technology process.

Figure 3A:
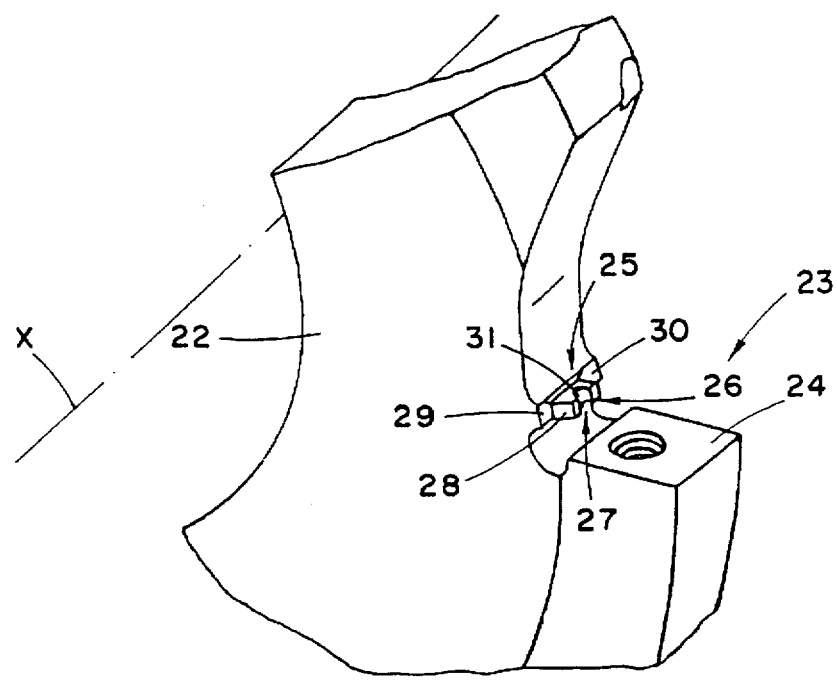
FIGS. 3a and 3b illustrate two designs of insert receiving pockets formed, according to the present invention, in tool holders of milling cutters of different types and adapted to receive cutting inserts of the kind shown in FIGS. 2a and 2b.
Figure 3B:
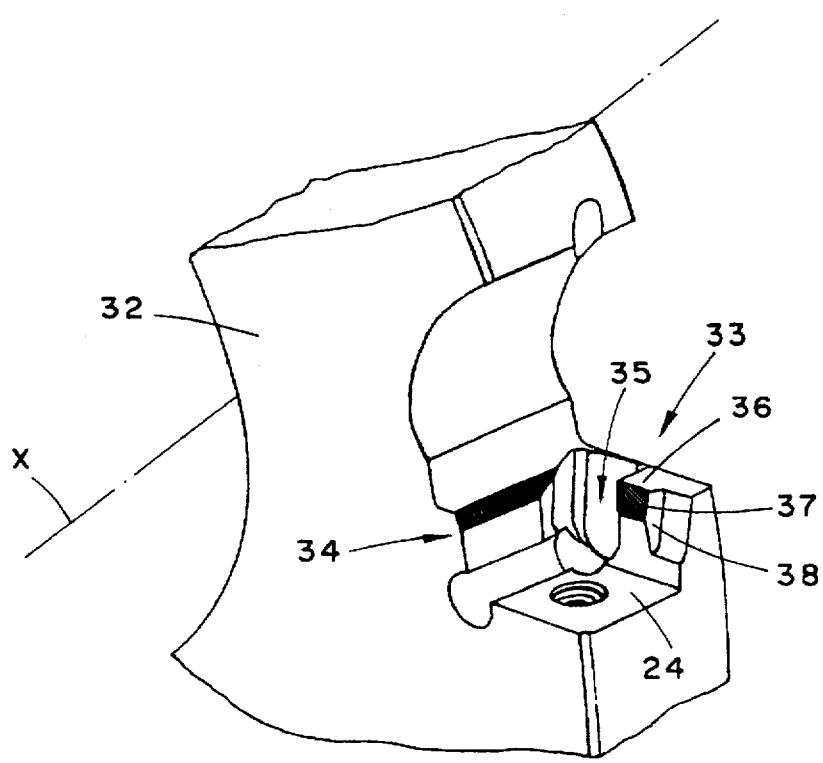

FIGS. 3a and 3b illustrate two designs of insert receiving pockets formed for mounting therein of the cutting insert 1 described above, for use in slotting cutters having different cutting widths relative to the length of the insert cutting edge.

Thus, FIG. 3a shows an insert receiving pocket 23 designated for use in a full side and face milling cutter 22 having a width of cut which equals or slightly exceeds the length of the insert cutting edge. As seen, the pocket 23 is open at both side faces of the cutter 22 and has a pocket base wall 24 adapted to support the base 6 of the insert 1 and a single pocket side wall 25 which is substantially co-directional with an axis of rotation X of the tool and is adapted to provide the insert support in both radial and axial directions.

For this purpose, the pocket side wall 25 is formed with a protrusion 26 of a cross-sectional shape generally mating that of the depression 14 of the insert 1. The protrusion 26 has a protrusion face wall 27 and protrusion side walls 28 (only one being seen), the later being oriented substantially transversely with respect to the rotary axis X of the tool and merging with lateral portions 29 and 30 of the pocket side surface 25. The height of the protrusion side walls 28 in the radial direction is less than a depth of the depression 14 of the insert and the width of the protrusion face wall 27 in the axial direction substantially equals the distance between the side walls 16 and 17 of the depression 14 and is preferably about half a length of the insert side surface 7a. Preferably, the protrusion 26 is designed to be flexible to ensure that a contact between the protrusion 26 and the insert depression 14 is substantially tight, which enables manufacturing of the insert with desired tolerances. This may be achieved either by providing the protrusion 26 with a groove 31 of a suitable width, formed in the central portion of the face wall 27 thereof, as shown in FIG. 3a and better seen in FIG. 4b, or rather in any other suitable manner.

FIG. 3b shows an insert receiving pocket 33 of a milling cutter 32 designed for larger widths of cut, which can be used in both half and full side and face milling cutters. The insert receiving pocket 33 differs from the insert receiving pocket 23 shown in FIG. 3a in that the pocket 33 has two pocket side surfaces 34 and 35. The pocket side surface 34 is disposed substantially co-directionally with the rotary axis X of the tool so as to provide insert support in the radial direction and the pocket side surface 35 is disposed substantially perpendicular to the rotary axis X of the tool and is designed to provide insert support in the axial direction.

For this purpose, the pocket side surface 35 is formed with a protrusion 36 having a protrusion face wall 37 and protrusion side walls 38 (only one being seen) and a cross-sectional shape generally mating the cross-sectional shape of the depression 14 of the insert. The height of the protrusion 36 in the axial direction exceeds the depth of the depression 14 and the width of the protrusion 36 in the radial direction is less than a length of the depression 14 and so that the protrusion can be freely received within the depression 14.

FIGS. 4a to 4d illustrate different embodiments of insert receiving pockets of the kind shown FIG. 3a with the cutting insert 1, according to the present invention, mounted therein.

Figure 4A:
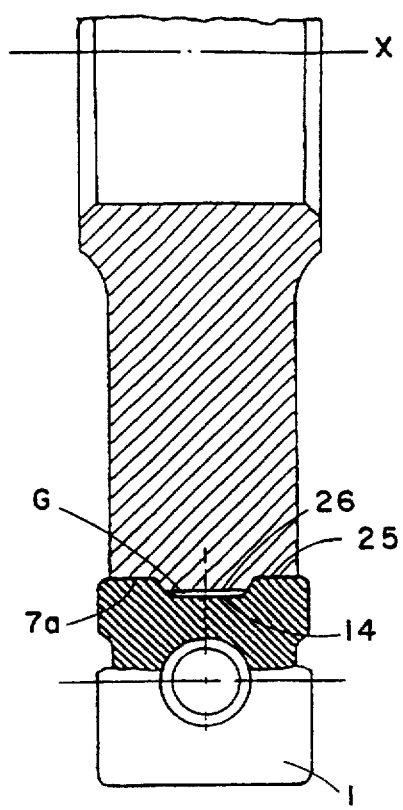
Figure 4C:
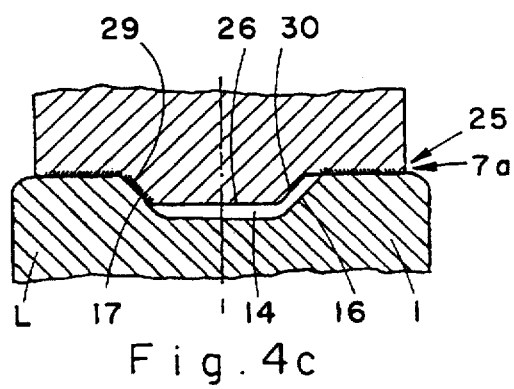
Figure 4B:
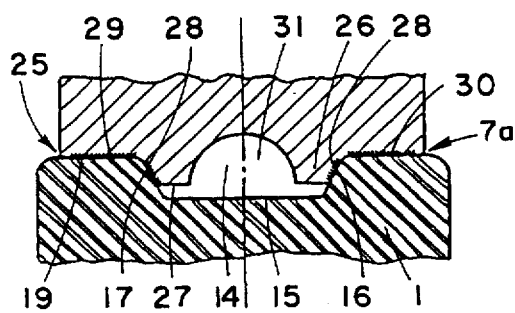
Figure 4D:
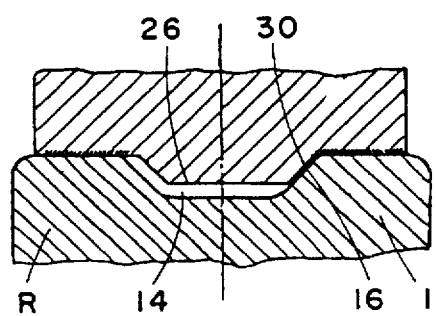

Thus, as schematically shown in FIG. 4a and better seen in FIG. 4b, the protrusion 26 of the side surface 25 of the pocket 23 is received within the depression 14 of the insert 1 so that there is left a gap G between the face wall 27 of the protrusion 26 and the bottom wall 15 of the depression 14. Thus, the depression side walls 16 and 17 of the insert side surface 7a bear against the protrusion side walls 28, providing thereby an axial support of the insert in the pocket, while lateral portions 18 and 19 of the same insert side surface 7a bear against the lateral surface 29 and 30 of the pocket side surface 25, whereby the radial support of the insert in the pocket is achieved. FIG. 4b illustrates the case when the protrusion is flexible.

Figure 5:
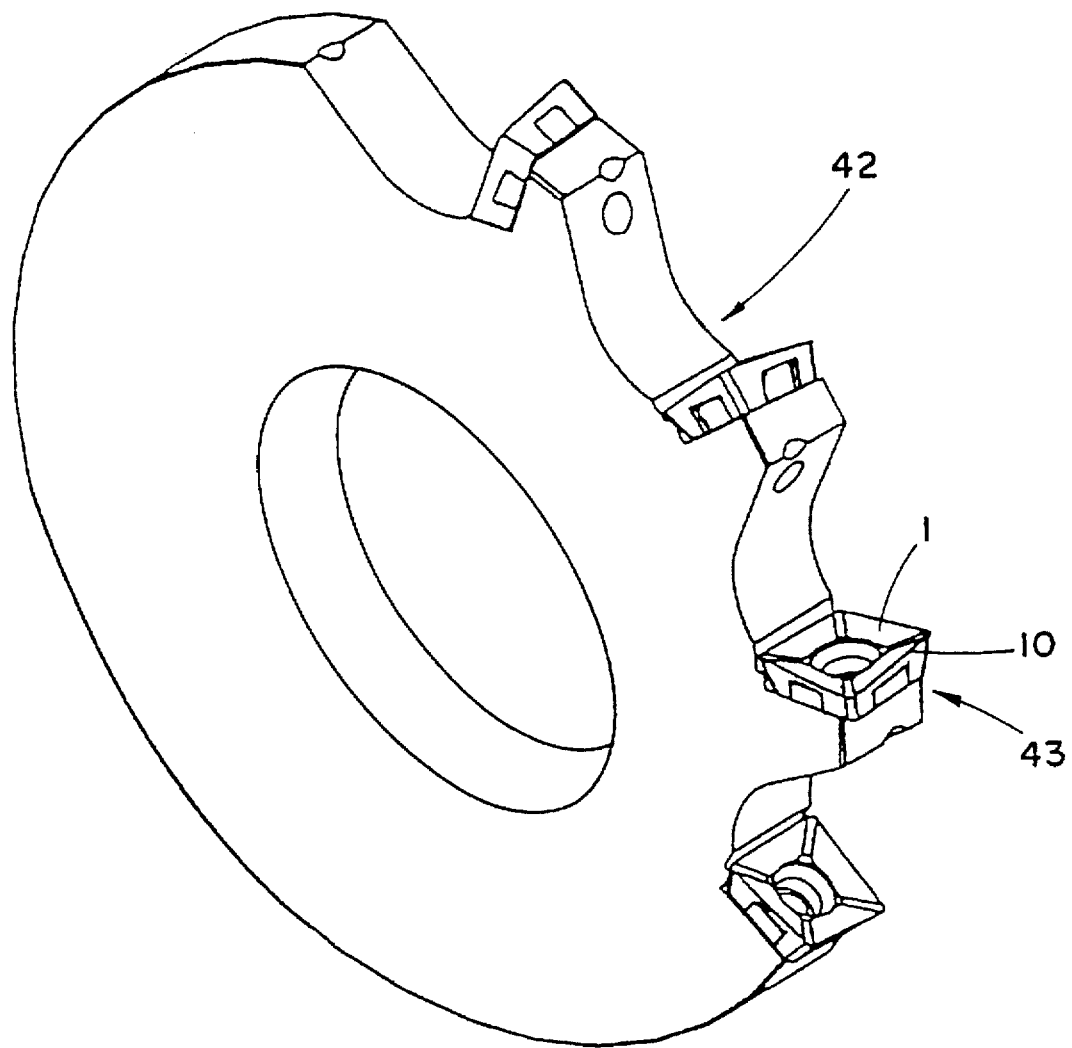
Figure 6:
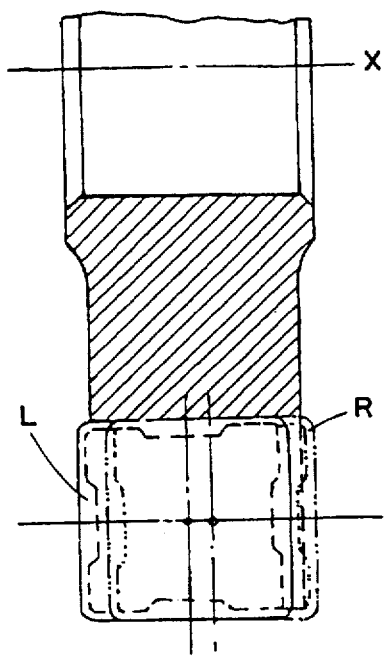
FIG. 6 is a schematic partially sectioned view of a milling cutter of the kind shown in FIG. 5, in which cutting inserts are shown being mutually superimposed.

Since, with the support arrangements as shown in FIGS. 4a and 4b the cutting inserts 1 are mounted in the pockets in an absolutely symmetrical manner with three cutting edges being operative, a cutting width of such full side and face milling cutter is defined solely by a length of the cutting edge of the insert. If, however, a slightly larger width of cut is required, a staggered left- and right-side mounting of the cutting inserts in the manner illustrated in FIGS. 4c and 4d can be employed. These arrangements require lower accuracy. Examples of such full side and face milling cutters are shown in FIGS. 5 and 6.

Thus, with the embodiments shown in FIGS. 4a to FIG. 4d, the axial support of the insert in the milling cutter is provided by the same insert side surface as the radial support, thereby consuming no additional space in the tool, making available three operative sides of the insert and improving thereby the efficiency of the slotting operation, which in this case may be fully effective.

Figure 7A:
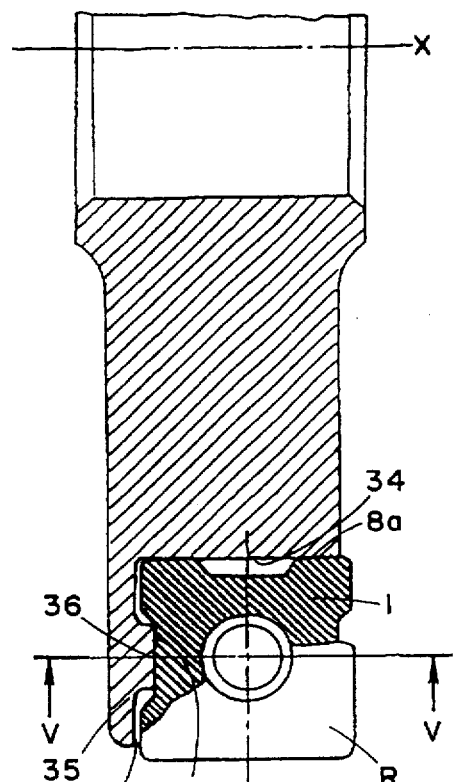
FIG. 7a is a schematic fragmental cross-sectional view illustrating one cutting insert mounted in a right-side fashion in a full side and face milling cutter having insert support arrangements according to the embodiment of the present invention shown in FIG. 3b.
Figure 7B:
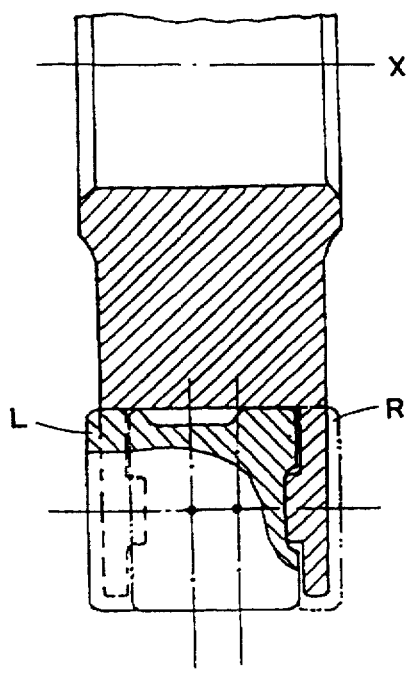
FIG. 7b is a schematic partially sectioned view of a full side and face milling cutter as in FIG. 7a, in which right- and left-side cutting inserts are shown being mutually superimposed.

FIG. 7a illustrates the cutting insert 1, according to the present invention, when mounted in the insert receiving pocket of the kind shown FIG. 3b. As seen in FIG. 7a, in this embodiment, the radial support of the insert in the cutting tool is provided by the lateral portions of the side surface 8a of the insert abutting the side surface 34 of the insert receiving pocket 33. For the provision of the axial support of The insert, the protrusion 36 of the pocket side surface 35 is freely received within the depression 14 of the insert side surface 7a in such a manner that the protrusion face wall 37 bears against the depression bottom wall 15. Thus, with the insert axial support being sufficiently wide to satisfy strength and rigidity requirements, the space required for the axial support is substantially decreased, enabling thereby the reduction of a minimal cutting width provided by the cutter by a value up to twice the depth of the depression. On the other hand, with a desired cutting width being predetermined, the width of the axial support can be effectively increased, improving thereby its strength and rigidity. Furthermore, since in this embodiment, the insert side surfaces contact the pocket side surfaces at three areas substantially remote one from another, an accurate positioning of the insert in the tool can be effectively achieved. However, this embodiment is suitable only for milling cutters with right- and left-side fashion of mounting cutting inserts, such as shown in FIG. 7b.

Figure 8:
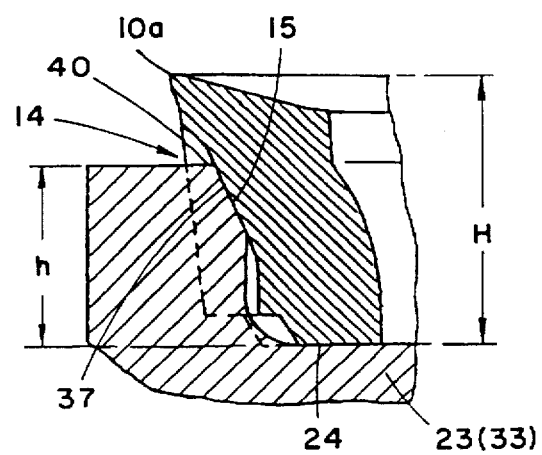

FIG. 8 shows that, in order to provide for a sufficiently stable position of the insert according to the present invention in a tool, the insert axial support is designed to occur substantially in the vicinity, of the cutting edge 10a of the insert. In particular, the protrusions and the depression 14 have such dimensions that a distance h from the base 24 of the respective insert receiving pocket 23, 33 to an uppermost region 40 of the protrusion-depression contact is at least not less but preferably greater than half a height H of the insert. Though FIG. 8 illustrates only the embodiment of the milling cutter shown in. FIG. 7a, it is preferable that all the embodiments of the present invention described above have a similar design.

Figure 9A:
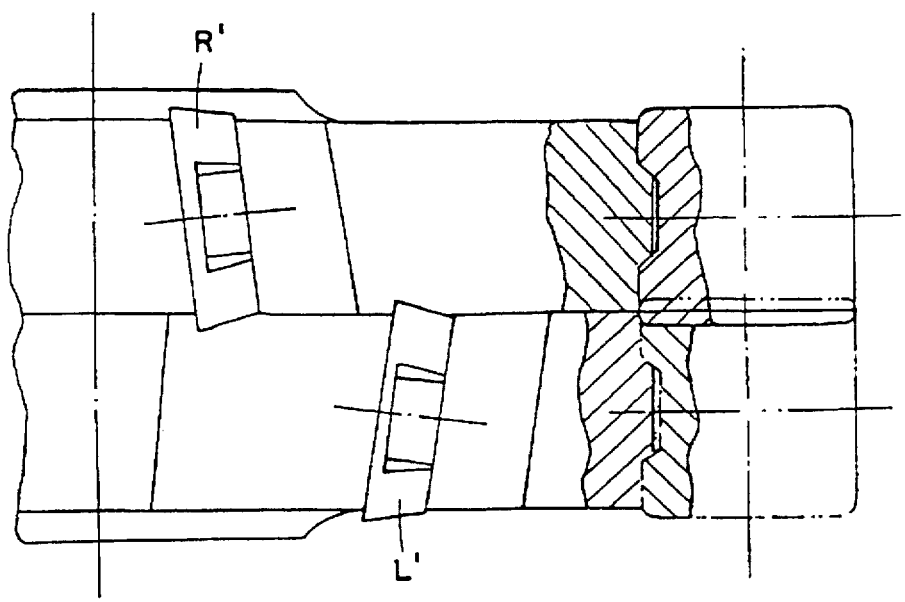
FIG. 9a illustrates a full side and face milling cutter of a tandem design having insert support arrangements as in FIG. 3a and cutting inserts mounted therein in an overlapping manner.
Figure 9B:
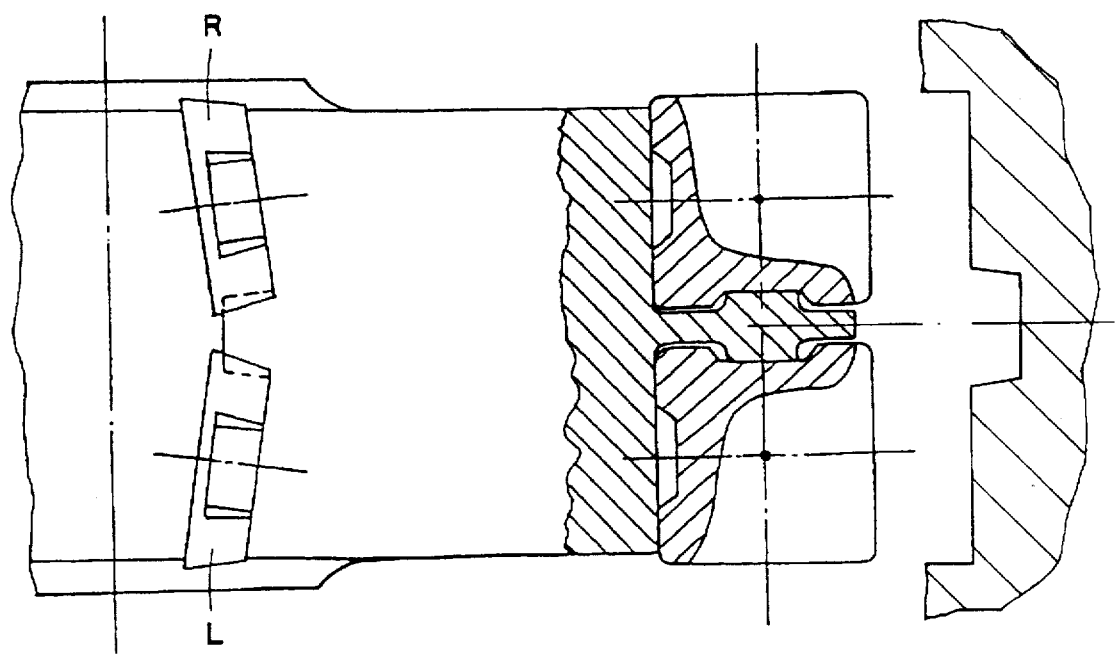
FIG. 9b illustrates a milling cutter of an integral design having insert support arrangements as in FIG. 3b and cutting inserts mounted therein without any overlapping to provide in a workpiece a fork-like profile.

FIG. 9a illustrates the use of cutting inserts, according to the present invention, in two half side and face right-hand and left-hand modular slotting cutters stacked in a gang arrangement on an arbor of a cutting tool, constituting thereby a full side and face milling cutter having a width of cut about twice the length of the cutting edge. As seen, inserts R' and L' are mounted in the pockets of the kind shown in FIG. 3a in the manner shown in FIG. 4a. FIG. 9b illustrates another milling cutter assembly having an integral tool holder formed with insert receiving pockets of the kind shown in FIG. 3b, in which the inserts are mounted in the manner shown in FIG. 7a, however without any overlapping, whereby the cutter provides in a machined surface a profile of a fork-like shape.

It should be understood that the design of an axial support arrangement and a cutting insert, according to the present invention, enables their advantageous application not only to the slotting cutters shown in the above examples but rather to milling cutters of other types where, for some or other reason, it is desired to reduce the space occupied by an insert axial support.

Figure 10A:
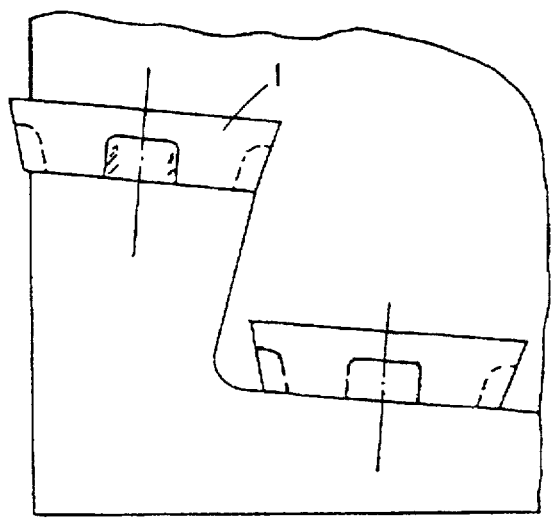
FIGS. 10a and 10b illustrate the use of the insert support arrangement of the present invention shown in FIGS. 3a and 4a, in an extended flute endmill.
Figure 10B:
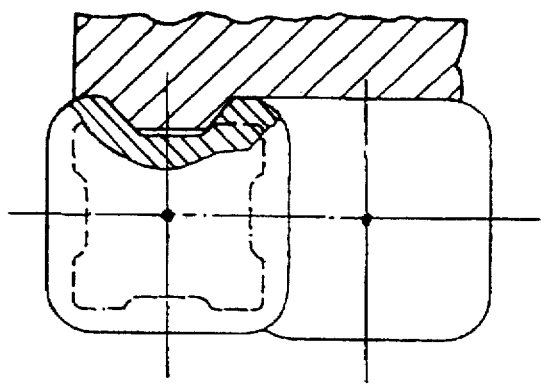
Figure 10C:
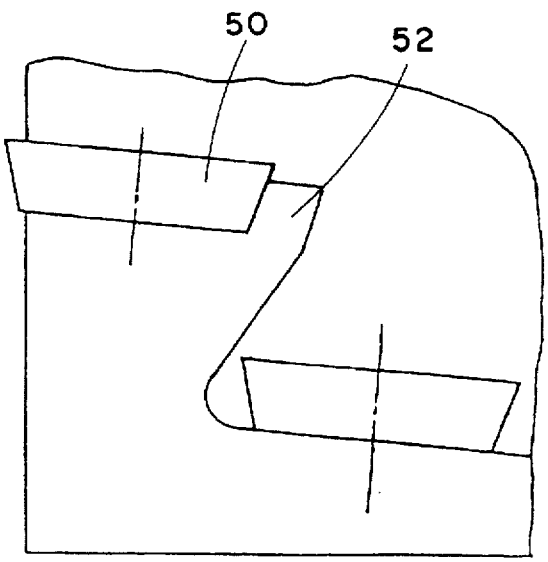
FIG. 10c is a fragmental side view of a conventional extended flute endmill.

Thus, FIGS. 10a and 10b show, for example, a particular application of the present invention to a frontal cutting insert which is mounted at a leading end 51 of an extended flute endmill. As known and illustrated in FIG. 10c, such a frontal cutting insert requires an axial support, the provision of which by a conventionally designed support arrangement 53 renders manufacturing of the endmill extremely complicated, deteriorates its tool strength and causes, during a milling operation, chip evacuation problems. However, when the support of a cutting insert 50 is designed according to the present invention, the above problems can be eliminated.

It should be mentioned that the cutting insert and the milling cutters according to the present invention may have features different from those described in the preferred embodiments and illustrated in the drawings. Thus, the insert receiving pocket can be adapted to receive two or more cutting inserts arranged successively in the axial direction of the tool, the pocket side wall being formed with a respective number of protrusions for the engagement with the corresponding depressions in the side surfaces of the cutting inserts. The cutting tool may also have a plurality of successive pockets arranged at different distances from the axis of rotation of the tool so as to increase the cutting dimension of the tool in the radial direction.

Figure 11:
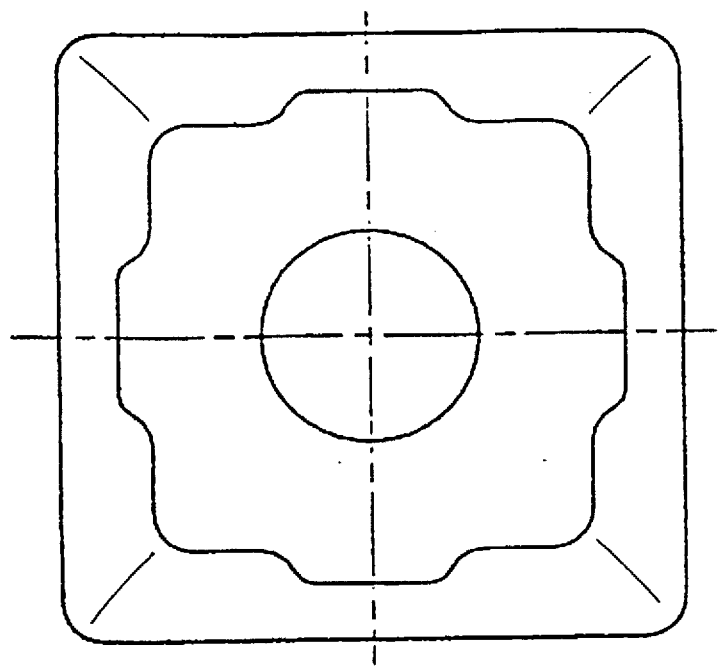
FIG. 11 is a bottom view of an alternative embodiment of a cutting insert according to the present invention.

In order to ensure provision of the axial support of the insert at predetermined areas thereof, the bottom and side surfaces of the depressions in the insert side surfaces may be formed with specifically shaped zones. As shown in FIG. 11, the cutting insert side surfaces may be formed with two laterally disposed depressions rather than with one centrally disposed depression. In order to provide a broad range of cutting widths with one milling cutter, each insert may be mounted in a suitable cartridge having an insert receiving pocket similar to those described above. The cartridge is secured in a suitably shaped depression formed in a tool holder of the cutting tool by means of screws or wedges with a possibility of adjustment the position thereof in the axial direction so as to provide a desired width of slot.

I claim:

1. A cutting insert for use in a rotary cutter tool having an axis of rotation, the insert being a substantially prismoidal body having top, base and side surfaces and cutting edges formed at intersections of the top and side surface;

the insert, when mounted in the tool, having at least one inoperative cutting edged and inoperative side surface associated therewith, said side surface having at least one depression formed symmetrically with respect to a center of the side surface length the depression terminating at an upper portion extending transversely to said side surface and disposed substantially in the vicinity of said top surface below the associated cutting edge;

the depression having a bottom wall oriented substantially co-directionally with said side surface and a pair of side walls oriented substantially transversely to said side surface, so that, when the insert is mounted in the tool, at least one wall of the depression is oriented generally transversely to said axis of rotation and constitutes an axial support portion of the cutting insert.

2. A cutting insert according to claim 1, wherein the cutting insert is an indexable cutting insert, each side surface of the insert being associated with a cutting edge and being formed with said at least one depression.

3. A cutting insert according to claim 2, wherein the cutting insert is of a basic square shape and has four indexable cutting edges.

4. A cutting insert according to claim 1, wherein, during cutting operations, one of said cutting edges functions as a front cutting edge parallel to said axis of rotation while at least one other cutting edge functions as a side cutting edge oriented substantially transversely to said axis of rotation.

5. A rotary cutting tool assembly comprising a tool holder having an axis of rotation and formed with at least one insert receiving pocket and at least one replaceable cutting insert releasably mounted therein by clamping means;

said cutting insert being a substantially prismoidal body having top, base and side surfaces, the top and side surfaces defining therebetween cutting edges;

said insert receiving pocket comprising pocket base and side surfaces such that the base surface of the pocket supports the insert base surface and the side surfaces of the insert and the pocket bear against each other at their portions oriented substantially co-directionally with said axis of rotation, providing thereby a radial support of the cutting insert, and at their portions oriented substantially transversely to said axis of rotation, providing thereby an axial support of the insert;

the insert side surface involved in said axial support having at least one depression formed symmetrically with respect to a center of the side surface length, the depression terminating at an upper portion extending transversely to said side surface and disposed substantially in the vicinity of said top surface below an associated cutting edge;

the depression having a bottom wall substantially co-directional with said insert side surface, and side walls substantially transverse thereto, at least one wall of the depression being oriented generally co-directionally with said axis of rotation and the pocket side surface involved in said axial support of the insert being formed with at least one protrusion mating with said at least one depression, the protrusion having face and side surfaces and being received within said depression so that said at least one wall of the depression abuts the respective wall of the protrusion, whereby said axial support of the insert in the tool is achieved.

6. A rotary cutting tool assembly according to claim 5, wherein the insert receiving pocket has a single pocket side surface, said single pocket side surface being oriented substantially co-directionally with the axis of rotation of the tool, said axial support being achieved by at least one side wall of the depression of the insert bearing against a corresponding side wall of the protrusion of the pocket, said radial support being achieved by the non-recessed portions of said insert side surface bearing against respective non-protruding portions of the single pocket side surface.

7. A rotary cutting tool assembly according to claim 6, wherein said protrusion has a flexible design and is at least partially inserted into said depression.

8. A rotary cutting tool assembly according to claim 5, wherein said insert receiving pocket has two pocket side surfaces of which one is disposed substantially co-directionally with the rotary axis of the tool and provides for the insert support in the radial direction, while the other pocket side surface is disposed substantially transversely to the rotary axis of the tool and comprises said protrusion, the protrusion being of such dimensions as to ensure that the face wall thereof abuts the bottom wall of said depression, providing thereby said insert support in the axial direction.

9. A rotary cutting tool assembly according to claim 5, wherein said axial support of the insert occurs substantially adjacent the top surface thereof.

10. A rotary cutting tool assembly according to claim 5, adapted for full side and face milling operations.

11. A rotary cutting tool assembly according to claim 10 wherein the tool holder is of a disk-like shape and has an integral tool holder body.

12. A rotary cutting tool assembly according to claim 10, wherein the tool holder is of a disk-like shape and has a tandem tool holder body.

13. A rotary cutting tool assembly according to claim 5, wherein said cutting tool is an endmill and said cutting insert is a frontal cutting insert mounted at a leading end of the endmill.

14. A rotary cutting tool assembly according to claim 5, wherein the cutting insert is mounted in said insert receiving pocket so as to present a front cutting edge parallel to said axis of rotation and at least one side cutting edge oriented substantially transversely to said axis of rotation.

15. A rotary cutting tool assembly comprising a tool holder having an axis of rotation and a cutting insert mounted in the tool holder;

said tool holder having at least one insert receiving pocket, said insert receiving pocket comprising a pocket base, a first pocket side wall oriented substantially co-directionally with said axis of rotation, and a second pocket side wall oriented substantially transversely to said axis of rotation, said second pocket side wall being formed with a protrusion having a face surface oriented substantially transversely to said axis of rotation and a pair of side surfaces oriented substantially co-directionally with said axis of rotation;

said cutting insert having a substantially prismoidal body with top, base and side surfaces and cutting edges formed at intersections of the side surfaces with the top surface, a depression formed in each of at least two adjacent first and second insert side surfaces, each depression being formed symmetrically with respect to a length of its insert side surface, each depression comprising a bottom wall oriented substantially co-directionally with its insert side surface and a pair of side walls oriented substantially transversely to its insert side surface, an uppermost portion of said depression terminating at an upper portion extending transversely to said side surface and disposed below a cutting edge associated with its insert side surface, at a position more than halfway up a height of said insert, wherein the first insert side surface is oriented substantially co-directionally with said axis of rotation with the first pocket side wall abutting at least one non-recessed portion of the first insert side surface, and the second insert side surface is oriented substantially transversely to said axis of rotation with the protrusion being received into the depression formed in said second insert side surface, a face surface of the protrusion abutting the bottom wall of the depression.

16. The assembly of claim 15, wherein the cutting insert is indexable, each side surface of the insert being formed with a depression.

17. The assembly of claim 16, wherein the cutting insert is of a basic square shape with four indexable cutting edges.

18. The assembly of claim 15, adapted for full side and face milling operations.

19. The assembly of claim 18, wherein the tool holder has a disk-like shape and an integral tool holder body.

20. The assembly of claim 18, wherein the tool holder has a disk-like shape and a tandem tool holder body.

21. The assembly of claim 15, wherein the tool holder is an endmill and said cutting insert is a frontal cutting insert mounted at a leading end of the endmill.

22. A rotary cutting tool assembly comprising a tool holder having an axis of rotation and a cutting insert mounted in the tool holder;

said tool holder having at least one insert receiving pocket, said insert receiving pocket comprising a pocket base and a single pocket side wall, said single pocket side wall being oriented substantially co-directionally with said axis of rotation, said single pocket side wall being formed with a protrusion having a face surface oriented substantially co-directionally with said axis of rotation and a pair of side surfaces oriented substantially transversely to said axis of rotation;

said cutting insert having a substantially prismoidal body with top, base and side surfaces and cutting edges formed at intersections of the side surfaces with the top surface, a depression formed in at least one side surface of the insert, said depression being formed symmetrically with respect to a length of its insert side surface, said depression comprising a bottom wall oriented substantially co-directionally with its insert side surface and a pair of side walls oriented substantially transversely to its insert side surface, an uppermost portion of said depression terminating at an upper portion extending transversely to said side surface and disposed below a cutting edge associated with its insert side surface, at a position more than half-way up a height of said insert, wherein the insert side surface is oriented substantially co-directionally with said axis of rotation with a non-protruding portion of the single pocket side wall abutting a non-recessed portion of the insert side surface, and with the protrusion being received into said depression, at least one side surface of the protrusion abutting a corresponding side wall of the depression.

23. The assembly of claim 22, wherein the cutting insert is indexable, each side surface of the insert being formed with a depression.

24. The assembly of claim 23, wherein the cutting insert is of a basic square shape with four indexable cutting edges.

25. The assembly of claim 22, adapted for full side and face milling operations.

26. The assembly of claim 25, wherein the tool holder has a disk-like shape and an integral tool holder body.

27. The assembly of claim 25, wherein the tool holder has a disk-like shape and a tandem tool holder body.

28. The assembly of claim 22, wherein the tool holder is an endmill and said cutting insert is a frontal cutting insert mounted at a leading end of the endmill.

* * * * *